Figures 1, 2:
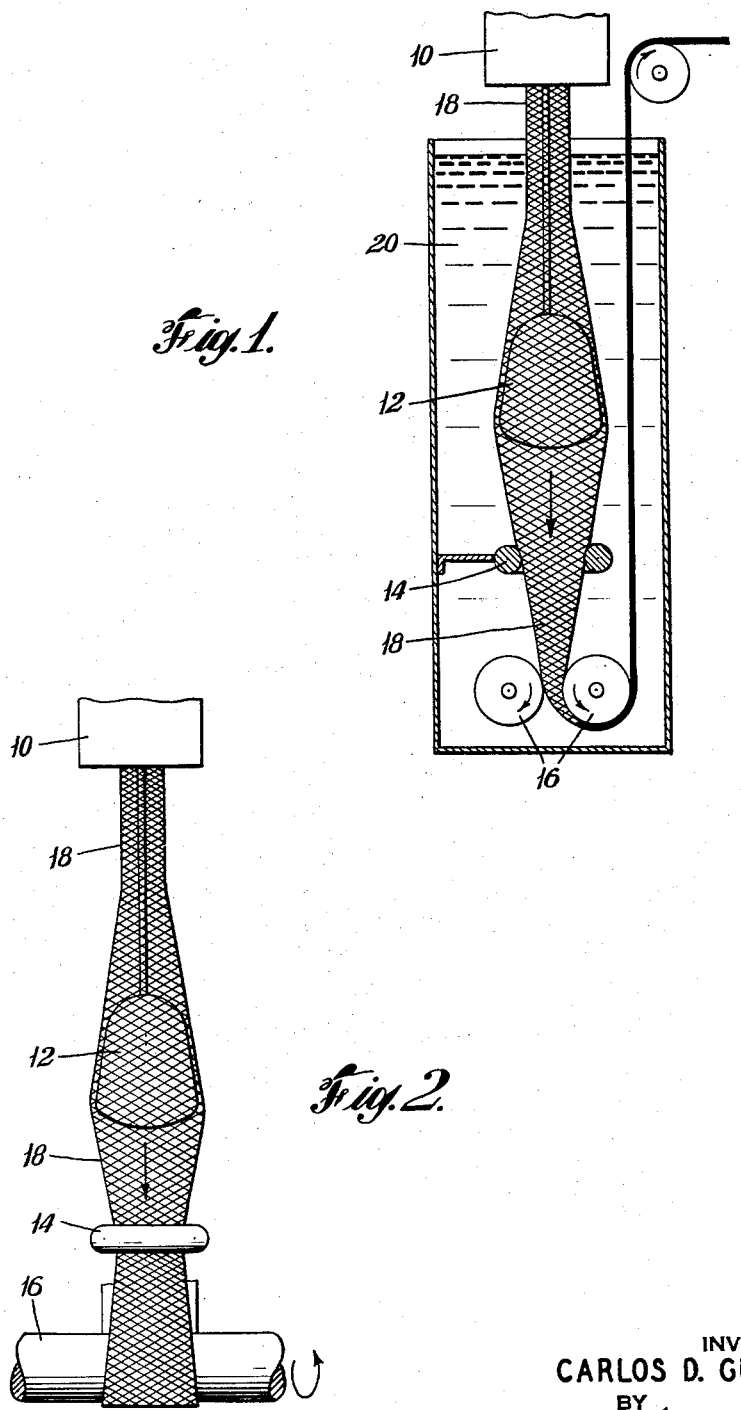

July 7, 1964

C. D. GUTIERREZ 3,140,330

PROCESS FOR STRETCHING PLASTIC NET

Filed Dec. 15, 1961

INVENTOR
CARLOS D. GUTIERREZ
BY
ATTORNEY

United States Patent Office 3,140,330
Patented July 7, 1964

3,140,330
PROCESS FOR STRETCHING PLASTIC NET
Carlos D. Gutierrez, Middlesex, N.J., assignor to Union Carbide Corporation, a corporation of New York
Filed Dec. 15, 1961, Ser. No. 159,613
6 Claims. (Cl. 264—288)

The present invention relates generally to a process for stretching plastic net and, more particularly, to a process for increasing the diameter and mesh size of tubular plastic net while maintaining a uniform mesh size therein.

Heretofore, a number of processes have been proposed for producing tubular plastic net by the extrusion of plastic material from annular arrangements of extrusion nozzles. It has also been proposed to vary the shape or size of the meshes of such net by the application of racking tension calculated to alter the mesh size or elongate the mesh strands. For example, both the diameter and mesh size of the tubular net may be increased by passing the tubular net over a mandrel having a diameter greater than the internal diameter of the tubular net. Such a mandrel also aids in forming a good bond between the crossing strands of the net in cases where the bonding is effected outside the die. Although the stretching mandrel seems to be a practical means for forming and stretching tubular net, it has been difficult to flatten the net as it is withdrawn from the mandrel without disturbing the distribution of tension in the net around the periphery of the mandrel. As a result, the flattened net is often non-uniform in both the size and shape of the mesh openings, and the non-uniformity increases with increasing mandrel sizes.

It is, therefore, the main object of the present invention to provide a process for increasing the diameter and mesh size of tubular plastic net while maintaining uniform meshes therein.

It is a further object of the invention to provide a process for equalizing the tension in tubular plastic net around a stretching mandrel.

It is another object of the invention to provide a process for producing relatively large-diameter plastic net with uniform strand diameters between the junctions.

Other aims and advantages of the invention will be apparent from the following description and appended claims.

In the drawings:

FIG. 1 is an elevation view, partially in section, of a preferred embodiment of the present invention; and FIG. 2 is an elevation view, partially in section, of the apparatus of FIG. 1 rotated 90°.

In accordance with the present invention, there is provided a process for increasing the diameter and mesh size of tubular plastic net by passing the net over a mandrel having a diameter greater than the internal diameter of the net so as to stretch the net; passing the stretched net through a sizing ring having an internal diameter substantially smaller than the diameter of the mandrel; and withdrawing the net from the sizing ring over means for flattening the net.

The sizing ring between the take-off roller and the stretching mandrel equalizes the tension in the tubular net around the mandrel, thereby producing meshes of uniform size and shape and strands of uniform diameter. The internal diameter of the sizing ring must be substantially smaller than the diameter of the mandrel, and is preferably about equal to the diameter of the unstretched net.

In addition to the radial stretching effected by the mandrel, the tubular net may be stretched in an axial direction by withdrawing it from the mandrel at a rate greater than the rate at which the net is passed onto the mandrel. Also, the net may be oriented by controlling its temperature during the stretching step, although the present invention is equally applicable where stretching of the net is effected without orientation. If it is desired to crystallize or heat stabilize the net, i.e., render it substantially non-shrinkable up to a certain temperature, the oriented net may be passed over a second mandrel having a diameter about equal to the diameter of the oriented net while maintaining it at a temperature between the orientation temperature and the second-order transition temperature of the plastic material comprising the net. This heat stabilization temperature is preferably that at which the crystallization rate is a maximum.

The inventive process and an apparatus for performing the process will now be described in greater detail by referring to the drawings. The preferred embodiment shown in FIGS. 1 and 2 comprises, in general, extrusion apparatus 10 for producing the tubular net, a stretching mandrel 12, a sizing ring 14, and a pair of take-off rollers 16.

The extrusion apparatus 10 may be any suitable apparatus for extruding plastic net, and a number of such apparatus are known in the art. One example of apparatus for extruding tubular net from counter-rotating circles of extrusion nozzles is described in detail in U.S. Patent No. 2,919,467 to Mercer. Although the net is preferably formed by extrusion, the inventive process is equally applicable to tubular net formed by other processes. For example, the net could be formed by molding, by conventional weaving techniques, by oscillating parallel strands so as to periodically contact and separate the strands, or by die cutting from a solid tube. Similarly, the present process is applicable to a great variety of net structures. For example, all the warp strands may be on one side of the net and all the weft strands on the other side, or the strands may cross each other on alternate sides. Alternatively, the strands may merely touch each other without actually crossing, or the net may be formed as an integral unit. Also, a great variety of mesh patterns may be used. The size of the strands and the size of the openings are not critical and depend largely on the intended use.

From the extrusion apparatus 10, the tubular plastic net 18 is passed over a mandrel 12 which has an outer diameter substantially greater than the internal diameter of the extruded net. As mentioned above, the mandrel 12 not only enlarges the tubular net but also aids in bonding the crossing strands of the net where the bonding is effected outside the die. The exact diameter of the mandrel depends on the degree of stretching required, and since the sizing ring 14 equalizes the tension in the net around the mandrel, relatively large-diameter mandrels may be used where desired. For good orientation, low density polyethylene net may be stretched to about five times its original size, while high density polyethylene net can be stretched to about ten times its original size. In general, the strength of the final net increases as the degree of stretching increases. The mandrel should have a smooth surface, but may be of any desired shape. For example, the mandrel may have the shape shown in the drawings, or may be in the shape of a circular ring or disc.

The mandrel 12 stretches the tubular net in a radial direction. If it is also desired to stretch the net in an axial direction, the net may be withdrawn from the mandrel at a rate greater than the rate at which the net is passed onto the mandrel. In the embodiment shown in the drawings, the net is drawn downwardly through a pair of rollers 16 driven by variable speed driving means (not shown). Thus, the rate of net withdrawal can be controlled by varying the speed of rotation of the rollers 16. Alternatively, the rate of withdrawal could be controlled by passing the net over a single take-off roll 16 and varying the force by which the net is withdrawn from the take-off roll.

As shown in the drawings, the mandrel 12 may be disposed in a heated bath 20 to maintain the net at its optimum orientation temperature. The orientation temperature should usually be between the melting point and the second-order transition temperature of the plastic material used to form the net. The second-order transition temperature is that temperature at which a discontinuity is noted in the first derivative of a primary thermodynamic property with respect to temperature, and is unaccompanied by the usual latent heat which appears in first order transition temperatures. Some of the thermodynamic properties that can be observed in determining the second-order transition point are specific volume, specific heat, density, heat of refraction, and modulus of elasticity. Since the specific polymer composition and the rate of heating may affect the observed second-order transition temperature, the optimum orientation temperature and heating rate should be determined by simple empirical tests.

From the mandrel 12, the stretched net is passed through a sizing ring 14 disposed between the mandrel 12 and the take-off rollers 16. As shown in the drawings, the sizing ring 14 is preferably disposed coaxially with the mandrel 12 and has an internal diameter about equal to the diameter of the unstretched net emerging from the extrusion apparatus 10. Of course, where the diameter of the mandrel is many times as great as the diameter of the unstretched net, the internal diameter of the sizing ring may also be larger than the diameter of the unstretched net. Also, where the mandrel is only slightly larger than the net, the sizing ring may have to be smaller than the unstretched net. The spacing between the sizing ring 14 and the mandrel 12 and the take-off rollers 16 is not narrowly critical, but it is preferred to locate the sizing ring about midway between the mandrel and take-off rollers. The sizing ring can be made of any smooth-surfaced, abrasion-resistant material, such as stainless steel. The cross-sectional shape of the sizing ring can be circular or some other shape which provides smooth inner surface in contact with the net.

From the sizing ring 14, the stretched net is withdrawn through the take-off rollers 16 so as to flatten the net. As indicated above, the net may be withdrawn over a single take-off roller or any other suitable means for flattening the stretched net.

While various specific forms of the present invention have been illustrated and described herein, it is not intended to limit the invention to any of the details herein shown, but only as set forth in the appended claims.

What is claimed is:

1. A process for increasing the diameter and mesh size of tubular plastic net comprising passing said net over a mandrel having a diameter greater than the internal diameter of said tubular net so as to stretch said net; passing the stretched net through a sizing ring having an internal diameter substantially smaller than the diameter of said mandrel; and withdrawing said net from said sizing ring over means for flattening said net.

2. The process of claim 1 wherein said sizing ring has a diameter about equal to the diameter of the unstretched tubular net.

3. The process of claim 1 wherein said sizing ring is disposed about midway between said mandrel and said flattening means.

4. The process of claim 1 wherein said net is stretched in an axial direction while being passed over said mandrel.

5. The process of claim 4 wherein said axial stretching of said net is accomplished by withdrawing said net from said sizing ring at a rate greater than the rate at which said net approaches said mandrel.

6. A process for increasing the diameter and mesh size of tubular plastic net comprising stretching said net in an axial direction while passing said net over a mandrel having a diameter greater than the internal diameter of said net, said net being maintained at an orientation temperature above the second-order transition temperature of the plastic material during said stretching step; passing the stretched net through a sizing ring having an internal diameter substantially smaller than the diameter of said mandrel; and withdrawing said net from said sizing ring over a take-off roller so as to flatten said net.

References Cited in the file of this patent

UNITED STATES PATENTS

| 2,919,467 | Mercer | Jan. 5, 1960 |
| 2,955,318 | Cook et al. | Oct. 11, 1960 |

FOREIGN PATENTS

| 676,776 | France | Feb. 27, 1930 |
| 524,777 | Great Britain | Aug. 14, 1940 |